(12) United States Patent
Ferrari et al.

(10) Patent No.: US 6,392,636 B1
(45) Date of Patent: *May 21, 2002

(54) TOUCHPAD PROVIDING SCREEN CURSOR/POINTER MOVEMENT CONTROL

(75) Inventors: Alberto Ferrari, Camposanto; Marco Tartagni, Meldola, both of (IT)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,065

(22) Filed: Jan. 22, 1998

(51) Int. Cl.[7] ............................................. G09G 5/00
(52) U.S. Cl. ..................... 345/173; 345/157; 345/161; 345/174; 345/178; 382/115; 382/116; 382/124
(58) Field of Search ................................ 345/157, 161, 345/173, 174, 178; 382/115, 116, 124; 356/71; 340/5.53, 5.83; 902/3, 6; 707/6; 434/155

(56) References Cited

U.S. PATENT DOCUMENTS

| | | | |
|---|---|---|---|
| 3,641,431 A | | 2/1972 | Pigage et al. ............. 324/61 R |
| 4,353,056 A | | 10/1982 | Tsikos ..................... 340/146.3 |
| 4,641,350 A | | 2/1987 | Bunn .......................... 382/4 |
| 4,958,129 A | | 9/1990 | Poduje et al. ................ 324/661 |
| 5,325,442 A | | 6/1994 | Knapp .......................... 382/4 |
| 5,369,228 A | * | 11/1994 | Faust .......................... 178/18 |
| 5,374,787 A | | 12/1994 | Miller et al. .................. 178/18 |
| 5,495,077 A | | 2/1996 | Miller et al. .................. 178/18 |
| 5,543,588 A | | 8/1996 | Bisset et al. .................. 178/18 |
| 5,543,590 A | | 8/1996 | Gillespie et al. ............. 178/18 |
| 5,543,591 A | | 8/1996 | Gillespie et al. ............. 178/18 |
| 5,648,642 A | * | 7/1997 | Miller et al. .................. 178/18 |
| 5,861,583 A | * | 1/1999 | Schediwy et al. ....... 178/18.06 |
| 5,943,044 A | * | 8/1999 | Martinelli et al. .......... 345/174 |
| 6,166,370 A | * | 12/2000 | Sayag ........................ 250/221 |

FOREIGN PATENT DOCUMENTS

| | | | |
|---|---|---|---|
| EP | 0 226 082 | 6/1987 | ........... G01R/27/26 |
| EP | 0 343 580 | 11/1989 | ............. G07C/9/00 |
| EP | 0 790 479 A1 | 8/1997 | ............ G01B/7/00 |

OTHER PUBLICATIONS

Wolffenbutter, et al., "Integrated Tactile Imager with an Intrinsic Contour Detection Option", *Sensors and Actuators*, Jan./Feb. 1989, No. 1/2, at pp. 141–153.

Young, et al., "Novel Fingerprint Scanning Arrays Using Polysilicon TFT's on Glass and Polymer Substrates", *IEEE Electron Device Letters*, vol. 18, No. 1, Jan. 1997, pp. 19–20.

(List continued on next page.)

Primary Examiner—Richard Hjerpe
Assistant Examiner—Jean Lesperance
(74) Attorney, Agent, or Firm—Lisa K. Jorgenson; Daniel E. Venglarik

(57) ABSTRACT

A plurality N of capacitance sensing cells are arranged in a row/column array top to cooperate with a fingertip and produce an output signal that controls the movement of a cursor/pointer across a display screen. The output of each individual sensing cell is connected to the corresponding individual node of a resistor array that has N nodes arranged in a similar row/column array. A centroid output of the resistor nodes in row configuration provides an output signal for control of cursor movement in a row direction. A centroid output of the resistor nodes in column configuration provides an output signal for control of cursor movement in an orthogonal column direction. A mass signal output of the row/column resistor mode array provides a switch on/off signal.

16 Claims, 3 Drawing Sheets

OTHER PUBLICATIONS

Tartagni, et al., "A 390dpi Live Fingerprint Imager Based on Feedback Capacitive Sensing Scheme", *1997 IEEE International Solid–State Circuits Conference*, p. 200.

Tartagni, et al., "Computing Centroids in Current–Mode Technique", *Electronics Letters*, vol. 29, No. 21, Oct. 14, 1993, pp. 1811–1813.

Standley, David L., "An Object Position and Orientation IC with Embedded Imager", *IEEE Journal of Solid State Circuits*, 26, Dec. 1991, pp. 1853–1858.

Sarma, et al., "Capacitance–Type Blade–Tip Clearance Measurement System Using a Dual Amplifier with Ramp/DC Inputs and Integration", *IEEE Transactions on Instrumentation and Measurement*, No. 5, Oct. 1992, pp. 674–678.

Yahagi, et al., "Moving–Window Algorithm for Fast Fingerprint Verification", IEEE Proceedings—1990 Southeastcon, vol. 1, Apr. 1990, pp. 343–347.

Kramer, et al., "Flash–Based Programmable Nonlinear Capacitor for Switched–Capacitor Implementations of Neural Networks", 1994 IEEE International Electron Devices Meeting, Dec. 1994, pp. 449–452.

* cited by examiner

TOUCHPAD PROVIDING SCREEN CURSOR/POINTER MOVEMENT CONTROL

CROSS-REFERENCE TO RELATED PATENT APPLICATION

U.S. patent application Ser. No. 08/799,548 by Marco Tartagni, filed Feb. 13, 1997, and entitled CAPACITIVE DISTANCE SENSOR is incorporated herein by reference. This application describes an Integrated Circuit (IC) capacitive distance sensor having a number of uses, including fingerprint acquisition. In this solid-state IC device, a portion of which is shown in FIGS. 1–3 of the present application, each individual cell 2 of a multi-cell array 3 includes a pair of flat metal armatures 23,24 that are spaced from each other in a horizontal plane to form a capacitor and to define a vertical distance "d" that is to be measured. Each cell 2 also includes the amplifier means shown in FIG. 2 wherein amplifier input 16 is connected to one armature 24, and wherein amplifier output 17 is connected to the other armature 23, to thereby provide a negative feedback circuit 17,23,25,18,24,16.

BACKGROUND OF THE INVENTION

1. Field of the Invention

This invention relates to the field of the manual control of a cursor, or pointer on a display screen, such as a computer display monitor or a television (TV) set.

2. Description of the Related Art

The prior art provides two general types of devices that achieve screen cursor/pointer movement control.

In a first type of device, of which a mouse is an example, continuous manual movement of the mouse across a generally horizontal surface is required in order to produce a continuous and corresponding direction of movement of the cursor/pointer across the display screen. This cursor/pointer movement stops when movement of the mouse stops. When the cursor/pointer must be moved a large screen distance, it is usually necessary to lift the mouse off of the surface, and then retrace the mouse over the horizontal surface one or more times.

In a second type of device, of which a joystick is an example, as long as the joystick is manually held in an off-center position, the cursor/pointer continuously moves in a corresponding direction across the screen. In order to stop this cursor/pointer movement, the joystick is returned to its center or neutral position.

The present invention will be described relative to embodiments of a fingertip operated capacitance touchpad whose end-result operation is generally the same as a joystick; however, the spirit and scope of the invention is not to be limited in this manner. That is, a fingertip position on the capacitance touchpad of the present invention produces cursor/pointer screen movement in accordance with the fingertip's position. The present invention finds particular utility in replacing glidepoint and trackpoint devices often found in portable computers, such as laptop computers and palmtop computers.

Embodiments of the present invention relate to a use of, and modifications to, a capacitance distance/fingerprint sensor, such as is described in the above-mentioned related patent application. The general use of capacitance-type sensors is known.

For example, the publication SENSORS AND ACTUATORS, January/February 1989, no.½, at pages 141–153, contains an article entitled INTEGRATED TACTILE IMAGER WITH AN INTRINSIC CONTOUR DETECTION OPTION that was presented at the Fourth International Conference on Solid-State Sensors and Actuators (Transducers '87), Tokyo, Japan, Jun. 2–5, 1987.

This article describes an integrated capacitive tactile imaging sensor that comprises a multi-layer construction having a bottom ceramic support, a 9-row/9-column array of square aluminum electrodes that are contained on a silicon wafer integrated circuit, a flexible and isolating intermediate layer that is made up of natural rubber, a thin conductive rubber layer, and a top protective layer. In this device, capacitance depends upon local deformation of the natural rubber layer. The 81 individual aluminum electrodes of this device provide capacitive measurement of an indentation pattern within the natural rubber layer, this indentation being caused by a pressure distribution that acts on the top protective layer.

The use of a capacitance-type sensor to sense the minutiae of a fingerprint is also known.

For example, the publication IEEE ELECTRON DEVICE LETTERS, VOL. 18, NO. 1, January 1997, pages 19–20, contains an article entitled NOVEL FINGERPRINT SCANNING ARRAYS USING POLYSILICON TFT'S OF GLASS AND POLYMER SUBSTRATES. This article describes a two-dimensional (2-D), 200×200, capacitance sensing array that is made up of 40,000 individual pixels. Each pixel of the array includes two Thin Film Transistors (TFTs) and a capacitor plate. Each array pixel resides at the intersection of an array-row and an array-column, and each array pixel is individually addressable by way of row-driver circuits and column-driver circuits.

Considering the two TFTs, hereinafter called TFT-A and TFT-B that are associated with a given pixel, the drain electrodes of TFT-A and TFT-B are connected to the pixel's capacitor plate, the gate electrode and the source electrode of TFT-A are connected to a row-conductor that is associated with the pixel, the gate of TFT-B is connected to the following row-conductor, and the source of TFT-B is connected to a column-conductor that is associated with the pixel.

A thin (0.1 micrometer) silicon nitride insulator overlies the capacitor plate of each array pixel. When the ridge of a fingerprint lies directly over the capacitor plate, a capacitor is formed between the capacitor plate and the finger. This capacitor is charged when a row-pulse (8 to 10 VDC, and of 10 to 100 microsecond duration) is applied to the pixel by way of the row conductor that is associated with this pixel and TFT-A. This stored charge is thereafter transferred onto the pixel's column-conductor through TFT-B when a row-pulse is applied to the following row-electrode.

Also of interest is the publication 1997 IEEE INTERNATIONAL SOLID-STATE CIRCUITS CONFERENCE that contains an article beginning at page 200 entitled A 390DPI LIVE FINGERPRINT IMAGER BASED ON FEEDBACK CAPACITIVE SENSING SCHEME. This article describes a single-chip, 200×200 element array, 2-metal digital CMOS technology sensor that is based upon feedback capacitance sensing, and that operates to detect the electrical field variation that is induced by the finger's skin surface. In each element of the array, two horizontally spaced metal plates are separated from the overlying and adjacent portion of the finger's skin surface by passivation oxide. Since the distance between the skin and the sensor's surface identifies the presence of the fingerprint's ridges and valleys, an array of elements provides a complete fingerprint pattern.

In each element of the array, the two metal plates are respectively connected to the input and the output of a high-gain inverter, to thereby form a charge integrator. In operation, the charge integrator is first reset by shorting the input and output of the inverter. A fixed amount of charge is then sinked from the input, causing the output voltage to swing inversely proportional to a feedback capacitance value that is inversely proportional to the distance to the fingerprint's ridges and valleys. The array of cells, or sensors, thus provides the complete fingerprint pattern. The fingerprint image disappears when the finger is removed from the array.

U.S. Pat. No. 4,353,056, incorporated herein by reference, is of interest in that it relates to a capacitance-type fingerprint sensor wherein a finger is pressed onto the surface of the sensor in order to read the ridges and valleys of the fingerprint. The sensor surface has a large number of capacitors of a small physical size associated therewith. Two sensors are described. In a first type of sensor, an electrical insulator carries a number of flexible and horizontally spaced curved metal electrodes, and two adjacent metal electrodes which comprise one capacitor. A protective insulating film overlies the electrical insulator, and when a finger is brought into physical contact with this protective insulating film, the metal electrodes are physically deformed, thereby selectively changing the capacitance of the large number of capacitors in accordance with the fingerprint's ridge/valley pattern. In a second type of sensor, the top surface of a rigid support carries a number of horizontally spaced and flat metal electrodes in a fixed position. Placed above the plane of the metal electrodes is the sequential arrangement of a flexible insulator, a flexible electrode, and a flexible protective membrane. A capacitor is formed between the top flexible electrode and each of the lower and fixed position flat metal electrodes. When the end of a finger is brought into contact with the flexible membrane, the flexible electrode becomes wavy in accordance with the fingerprints' ridges/valleys pattern.

In addition, U.S. Pat. No. 5,325,442, incorporated herein by reference, relates to a capacitance-type fingerprint sensor having a sensing pad that comprises a planar array of row/column sensing elements having a pitch of about 100-micrometers. Each sensing element is located at the intersection of a row conductor and a column conductor, and in each sensing element, a sensing capacitor comprises a planar sensing electrode that is spaced from a finger surface by way of an insulating film that overlies the sensing electrode. The plurality of sensing electrodes that make up the array are regularly spaced and equal size rectangles.

The sensing elements are fabricated using photolithographic processes, and each individual sensing element includes a Thin-Film-Transistor (TFT) in the form of a Field-Effect-Transistor (FET). Each FET gate is connected to a row conductor, each FET source is connected to a column conductor, and each FET drain is connected to a sensing electrode.

In one embodiment, each sensing element comprises a sensing capacitor that is formed between a sensing electrode and the finger. In another embodiment, each sensing element includes an electrically isolated and conducting pad that is physically engaged by the finger.

European patent application EU 96830068.1 is also of interest. This application discloses an array of capacitance sensors that are operable to detect the fingerprint pattern of a finger that is touching the top or upper surface of the array.

U.S. Pat. Nos. 5,374,787, 5,495,077, and 5,648,642 are of interest in that they provide object/proximity detectors having a plurality of sensor pads/lines that are disposed in a row/column matrix.

U.S. Pat. No. 5,543,588 is of interest in that it discloses a hand-held device having a disposed screen on one side thereof and a touch sensitive transducer disposed on the opposite side.

U.S. Pat. Nos. 5,543,590 and 5,543,591 are of interest in that they disclose a device for moving a cursor on a display screen wherein a sensing plane includes a matrix of row/column oriented conductor lines.

While prior devices as above described are generally useful for their limited intended purposes, a need remains in the art for a capacitance-type touchpad that operates to simulate a joystick or a mouse wherein the position of a fingertip on the upper surface of the capacitance touchpad produces cursor/pointer screen movement.

SUMMARY OF THE INVENTION

This invention may be based upon the use of a matrix array of capacitance sensors; for example, a matrix array as is shown in above-mentioned European patent application EU96830068.1.

The array of this invention can be initially used to acquire a user fingerprint; for example, as a user-identification (ID) procedure that occurs during log-on to a device, such as a laptop or a palmtop computer. Subsequent operation of the computer often requires control of the movement of a cursor across a display screen. The array of this invention also provides this cursor movement.

That is, when a user first logs onto the computer, the array of this invention captures a fingerprint pattern that is used to determine user-authorization. Thereafter, the array is used to provide screen cursor/pointer control, with the cursor/pointer moving across the screen by virtue of the position of a fingertip on the upper surface of the array. This fingertip position is achieved, after fingerprint acquisition, only by rolling and/or pitching the fingertip on the top surface of the array. In an embodiment of the invention, cursor/pointer movement stops when the fingertip is removed from the array, or when the fingertip is moved to a mid-position on the top surface of the array.

During log-on, when the user is being identified/verified by comparing a sensor-acquired fingerprint pattern to memory-stored fingerprint patterns, the individual cell output of the array is serially scanned. Thereafter, and as the array is used in accordance with this invention, in order to achieve screen cursor/pointer control, the individual cell output of the array need not be scanned. Rather, each individual cell output of the array is connected to a corresponding individual node of a row/column resistive network.

While embodiments of the invention will be described relative to features, such as cursor control, utility is also found in applications such as ATM machines, wherein user fingerprint authorization is first obtained, followed by using the array as an input device for choice selection and Yes/No responses to the ATM machine.

The sensing array of this invention can also be used as a pointing device in a 3D virtual reality application, in which case, the array is mounted over a structure that follows the movement of the fingers of a user's hand. In this way, a user is enabled to make selections using a finger and a 3D virtual menu, and in 3D virtual games, the array can be used to sense planar X,Y direction as well as Z direction commands.

The array of this invention provides X-direction cursor/pointer movement commands (i.e., left/right screen movement commands) as the fingertip is moved, or rolled sideways, on the array's upper surface. The array of this invention provides Y-direction cursor/pointer movement commands (i.e., up/down screen movement commands) as the fingertip is moved or pitched end to end on the upper surface of the array. The array of this invention provides Z-information, or switch-closed information, as the fingertip is pressed vertically down into the upper surface of the array. The upper surface of the array of this invention is about 1 cm square, and usually cooperates with the tip of a user's index finger.

When the gain of such a capacitance fingerprint sensing cell (for example, as is shown in the above-mentioned EU patent application) is adjusted to be high, or when the resolution of the array is low, the electrical output of the array is a two-dimensional "electronic picture" having a bright blob on a dark background. The position of the blob within this electronic picture corresponds to the contact area of the fingertip with the upper surface of the sensor.

The first moment coordinates of the position of this blob, or brightness function, encodes the X displacement and the Y displacement, or the fingertip position on the upper surface of the array, while the zero-moment value of this brightness function encodes the fingertip's downward pressure function.

In order to calculate the X output and Y output of the array, two options are available. First, the entire electronic image of the array, or picture, is transferred into a computation system where these two outputs (also called "mass" and "centroid") are calculated using hardware or software techniques. Second, analog computation is performed directly on the picture output of the sensor.

Relative to FIG. 8, the two-dimension (2D) electronic signal output, or pattern of the array which encodes the touching function of a fingertip on the upper surface of the array, is injected into a 2D pseudo-resistive network, as shown in FIG. 8. This network now detects the centroid, or first-moment and mass, or second moment of the incoming array output signal. The functions centroid and mass are calculated simultaneously by the FIG. 8 arrangement.

In accordance with a feature of this invention, the pseudo-resistive network of FIG. 8 can be embedded within the sensor array of FIG. 1 using integrated circuit techniques, to thereby provide an integrated device. For example, each resistor of FIG. 8 can be implemented with a MOS transistor, as taught and illustrated in an article by M. Tartagni and P. Persona entitled "COMPUTING CENTROIDS IN CURRENT-MODE TECHNIQUE" in the publication ELECTRIC LETTERS (29 (21), 1811–1813, October 1993.

An object of this invention is to provide a plurality N of capacitance sensing cells that are arranged in a generally planar row/column array, to cooperate with a fingertip to produce an output signal that controls the movement of a cursor/pointer across a display screen. The output of each individual sensing cell is connected to the corresponding node of a resistor array that has N nodes arranged in a similar row/column array. A centroid output of the resistor nodes in row configuration provides an output signal for control of cursor movement in a row direction. A centroid output of the resistor nodes in column configuration provides an output signal for control of cursor movement in an orthogonal column direction. A mass signal output of the row/column resistor modes provides a switch on/off signal.

While the invention will be described while making comparisons to the well-known joy-stick type of device, those skilled in the art will recognize that the invention also finds utility in replacing mouse-like devices.

These and other object, features and advantages of this invention will be apparent to those of skill in the art upon reference to the following detailed description of preferred embodiments of the invention, which description makes reference to the drawing.

The various figures are provided with a X-Y-Z three-dimensional coordinate system, and with legends reading top, bottom, left and right, in order to relate the various figures one to the other, and in order to relate the direction of screen cursor/pointer movement to certain of the figures.

DESCRIPTION OF THE PREFERRED EMBODIMENT

Figure 1:
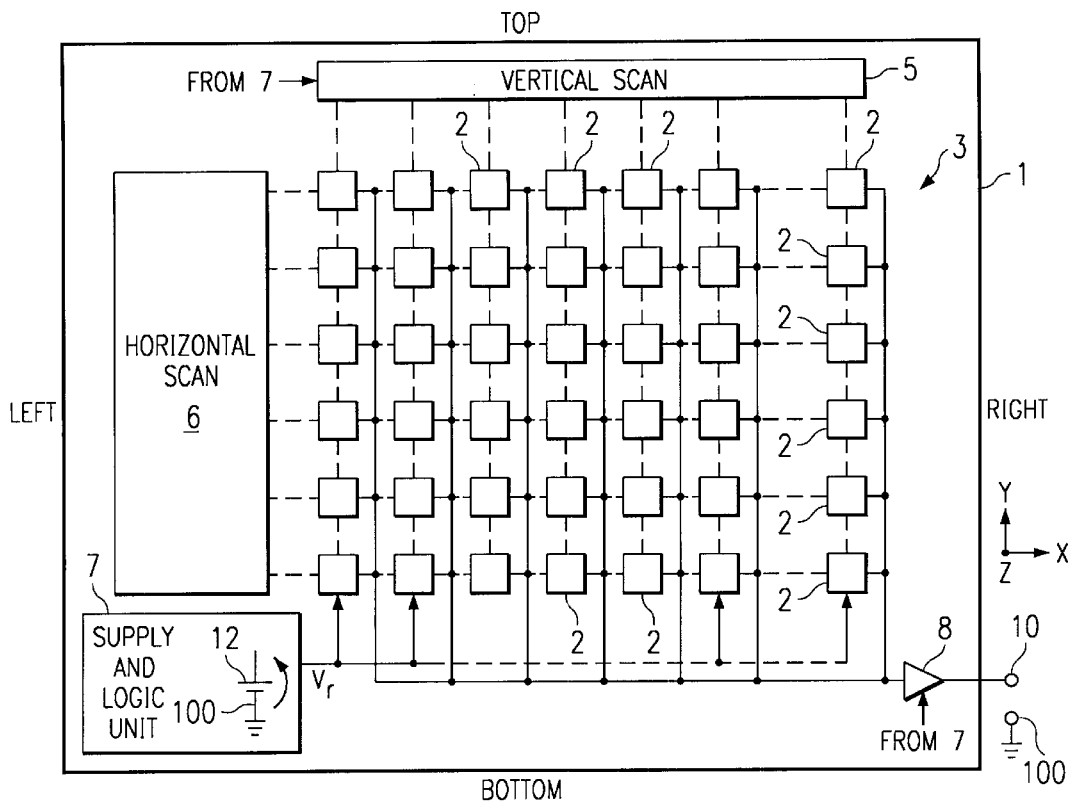
FIGS. 1, 2 and 3 relate to the above-mentioned related U.S. patent application, and are used in embodiments of this invention.
Figure 2:
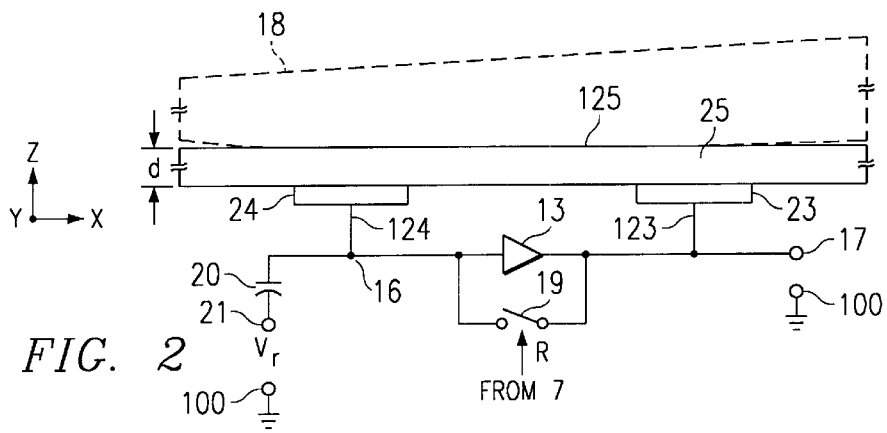
Figure 3:
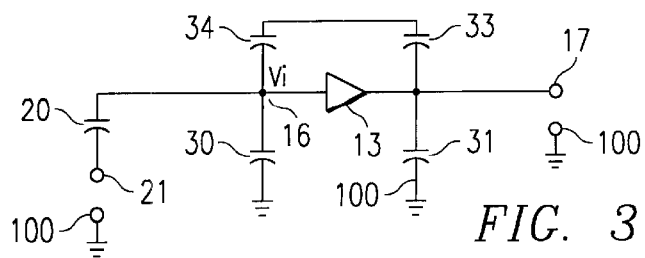

FIGS. 1, 2 and 3 correspond to the above-mentioned related U.S. patent application, and versions thereof are usable in embodiments of the present invention.

FIG. 1 is a top view of an IC device 1 that includes a generally planar, multiple pixel, multiple row/column, array 3 having a relatively large number of solid state capacitive sensor cells, or nodes 2, that operate to provide a serial signal electrical output 10 that comprises a multiple pixel fingerprint pattern, or electrical signal picture of a fingerprint. As shown, FIG. 1 is taken in the X-Y plane.

Array 3 (which includes all individual nodes 2) contains the number N of horizontal or X-direction extending rows of individual nodes 2. Each row has the number M of individual nodes 2 therein. Array 3 thus contains the number M of vertically or Y-direction extending columns of individual nodes 2, and each column has the number N of individual nodes 2 therein. The numbers N and M are integers that may or may not be equal to each other. The number of individual picture elements, pixels, nodes, or cells 2 within array 3 is quite large for fingerprint pattern acquisition, and equals the product of M×N. An example is 512×512 pixels, nodes, or cells 2 within array 3, array 3 being of a physical size of about 20 mm to about 25 mm.

FIG. 2 shows a fingertip 18 in physical contact with the upper and active surface 125 of array 3.

During fingerprint pattern acquisition, each individual cell 2 that is within array 3 is addressable by virtue of each cell being physically located at a unique intersection of a row/column of array 3. The manner in which the individual cells 2 of array 3 are addressed and read out in order to digitize a fingerprint pattern are well known to those of skill in the art, and do not form a limitation on this invention.

IC device 1 includes a horizontal scanning stage, or network 6, and a vertical scanning stage or network 5 for sequentially interrogating, or reading, one cell 2 at a time during fingerprint pattern acquisition according to a predetermined scanning pattern. Preferably, stages 5 and 6 comprise shift registers, or decoders, that operate to interrogate the FIG. 2 outputs 17 of cells 2 in a time sequence.

IC device 1 also includes a supply/logic stage or network 7 that operates to supply the IC device components, including all cells 2, with necessary operating voltages, and to control the sequence of steps that are necessary for operation of IC device 1. In particular, a DC voltage source 12 provides a DC reference voltage Vr that is referenced to ground potential at 100. A buffer 8 is connected to the outputs 17 of all cells 2. Output 10 of buffer 8 comprises the sequentially arranged output signal of IC device 1, the signal at output 10 being controlled by operation of scanning stages 5 and 6.

FIG. 2 schematically shows the circuit of a single cell 2 of the array 3 of FIG. 1. All cells 2 are generally identical in construction and arrangement. Each cell 2 includes a low-power, signal inverting, node-amplifier 13 having an exemplary gain from about 3000 to about 4000.

Terminal 21 comprises the input to the circuit of a cell 2, and terminal 21 and input capacitor 20 connect to input 16 of amplifier 13. Terminal 17 comprises the output of cell 2 and its amplifier 13. Each cell 2 also includes two X-Y planar armatures, or metal capacitor plates 23,24, connected to output 17 and input 16 by connections 123 and 124, respectively, that are of a generally equal X-Y area, and that are horizontally or X-direction spaced from each other within a common X-Y plane.

A thin dielectric layer 25 covers capacitor plates 23,24, and the upper horizontal surface 125 of layer 25 provides an active array surface for physical contact by the skin surface 18 of a finger whose fingerprint is to be sensed, determined or acquired. Dielectric layer 25 may cover the entire face of the upper portion of IC device 1 that includes array 3 and its individual cells 2.

In use for fingerprint pattern acquisition, a fingertip 18 is placed on the upper surface 125 of the dielectric layer 25 of array 3. Skin surface 18 thereby forms an armature, or electrode, that vertically overlies and faces the top, X-Y planar, surfaces of capacitor plates 23,24. Skin surface 18 operates to define with plates 23,24 a first capacitor 34, as shown in FIG. 3, and a second capacitor 33 as shown in FIG. 3. Series connected compound capacitors 33,34 are connected in negative feedback fashion from amplifier output 17 to amplifier input 16.

Each FIG. 2 node-amplifier 13 also includes a normally-open start, reset, or control switch 19, preferably in the form of a MOS switch. Switch 19 selectively and momentarily operates to short amplifier input 16 to amplifier output 17. Switch 19 is controlled by a control signal "R" that is provided by the supply and logic unit 7 of FIG. 1. At the start of a fingerprint acquisition operation, switches 19 of all array cells 2 are momentarily closed, and the voltage level at all cell inputs 21 is thus maintained at a constant magnitude. In this way, the input voltage of all cells 2 is brought to the same potential as the cell's output voltage.

Shortly thereafter, supply and logic unit 7 operates to open all reset switches 19, and to supply all cell inputs 21 with a step voltage that is equal in magnitude to reference voltage Vr. An electrical charge is now induced at each of the cell input capacitors 20, thus permitting the reading of the local and individual Z-direction cell distances "d" that exist between a cell's capacitor plates 23,24 and the overlying skin surface 18 of the cell.

Scanning stages 5,6 of FIG. 1 now operate to sequentially enable the reading or interrogation of the many cells 2 within array 3. In this way, buffer 8 operates to sequentially provide an output 10 in the form of a sequence of gray levels of voltage that provide a three-dimensional readout, and display of the skin surface 18 of the finger that is currently resident on the top surface 125 of array 3.

FIG. 3 is an equivalent circuit of the single cell circuit shown in FIG. 2. The input capacitance of amplifier 13 is shown at 30, the output capacitance of amplifier 13 is shown at 31, and the two above-mentioned series connected and skin-sensitive capacitors are shown at 33,34.

In accordance with a feature of this invention, the gain of each amplifier 13 can be increased in order to provide an output signal from the FIG. 1 array that comprises the corrected shape 170 shown in the various areas of FIGS. 5A–5I. However, this increased gain feature is not required, since this corrected shape can also be calculated over the fingertip's complicated fingerprint pattern because the center of mass of the group of objects comprising the fingerprint is positioned in the center of the group of objects. When the increased gain feature is desired, it is implemented by a step change in the magnitude of the voltage Vr of FIG. 1.

In use as a capacitance touchpad in accordance with the spirit and scope of this invention, the output 17 of all cells 2, or node-amplifiers 13, is a picture-signal that appears as a bright blob 170 that is positioned on a dark background, as is shown in FIGS. 5A–5I. The position of this blob 170 within the picture encodes the contact area/position of finger 18 with the top surface 125 of the capacitance touchpad. This blob output signal function 170 can also be achieved by a construction and arrangement that ensures that the resolution of the cell-array matrix is low.

Figure 4:
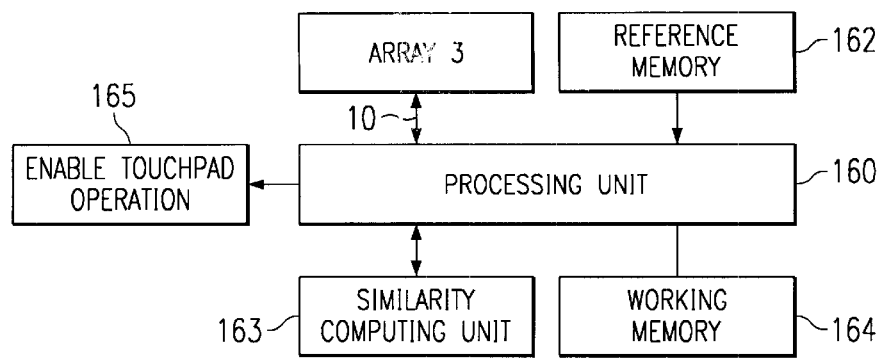
FIG. 4 is a flowchart that shows a fingerprint pattern acquisition process whereby a FIGS. 1–3 arrangement is initially used during an initial user-authorization log-on procedure, which user thereafter uses a version of the FIGS. 1–3 arrangement in capacitive touchpad arrangements of the present invention in order to generate a cursor/pointer screen direction/movement control signal.

FIG. 4 is a diagram that shows a fingerprint pattern acquisition system, whereby the arrangement of FIGS. 1–3 is used in a low-gain mode during an initial log-on by a computer user, which user thereafter uses the capacitance touchpad construction and arrangement of the present invention to generate a cursor/pointer screen direction/movement control signal, and/or a switch on/off the touchpad signal.

During fingerprint pattern acquisition, the buffer output 10 from array 3 of FIG. 1 is connected to a processing unit 160. In the sequence of operation, start switches 19 of all cells 2 are momentarily closed. Thereafter reference step pulse voltage Vr is applied to all amplifier inputs 21, and thereafter all cell outputs 17 are presented to buffer output 10 in accordance with a sequence that is established by vertical and horizontal scan networks 5,6. As a result, the fingerprint pattern of fingertip 18 is presented as an input 10 to processing unit 160. Connection 10 between array 3 and processing unit 160 is shown to be bi-directional in order to signify the changing of array sensitivity when changing from fingerprint acquisition to touchpad operation.

Reference memory 162 contains a number of previously-stored fingerprint patterns; for example, one fingerprint pattern for each authorized user. A similarity computing unit 163 compares input 10 to the patterns that are contained in memory 162, and when a pattern match is detected, the identity of the current touchpad/computer user is recorded in working memory 164.

As will be apparent, after the identity of the current touchpad/computer user has been established, unit 165 enables use of the touchpad of this invention as a joystick-type touchpad. As mentioned previously, this joystick-type use of the touchpad takes place in a high-gain mode of FIGS. 1–3.

When the capacitance touchpad of this invention is used in its high-gain mode to achieve cursor/pointer control on a display screen, the composite outputs 17 of all array cells 2 comprises an electronic picture-signal that appears as a bright blob that is positioned on a dark background.

FIGS. 5A through 5I show such a picture-signal for various positions of a fingertip 18 on array surface 125. The position of bright blob 170 in each of these figures corresponds to the contact area, or position of fingertip 18 with the top surface 125 of the capacitance touchpad. The center of each blob 170 is shown at 470. As stated previously, a Z-direction depression of fingertip 18 when it is in any of the FIG. 5A–5I positions, modifies or enlarges the mass of bright blob signal 170, so as to provide a switch-closed signal.

Figure 5F:
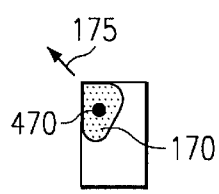
FIGS. 5A through 5I show a two-dimensional (2D) electrical picture signal that is generated by the capacitance touchpad of this invention for various positions of a fingertip on the touchpad upper surface, each of these figures having a mass outline and a centroid-dot that is located within the mass outline.
Figure 5B:
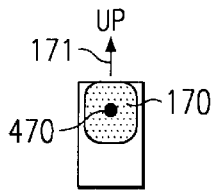
Figure 5H:
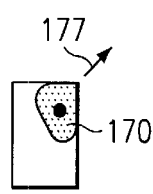
Figure 5E:
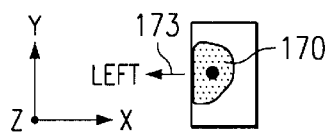
Figure 5A:
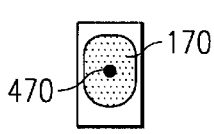

In FIG. 5A, the fingertip center 470 is located in a mid-position on array surface 125, and in this position, no cursor movement is produced. However, the relatively large mass, or size of blob 170 that is shown in FIG. 5A, is indicative of a switch-closed condition that is produced by pressing fingertip 18 vertically down onto array surface 125.

Figure 5D:
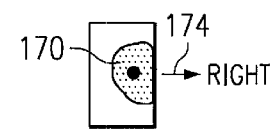
Figure 5C:
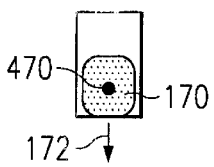
Figure 6:
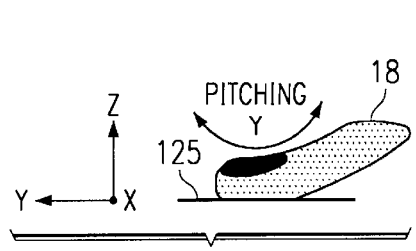
FIG. 6 shows the Y-direction pitching of a fingertip end to end on the touchpad upper surface.

FIG. 6 represents the Y-direction pitching of fingertip 18 end to end on surface 125. In accordance with the direction of this pitching movement, a bright blob 170 is produced, as is shown in FIGS. 5B and 5C. That is, the pitching of fingertip 18 upward in FIG. 6 produces the condition shown in FIG. 5B, and upward cursor movement occurs, as is represented by arrow 171. However, when the FIG. 6 pitching of fingertip 18 downward produces the condition of FIG. 5C, downward cursor movement as represented by arrow 172 occurs.

Figure 7:
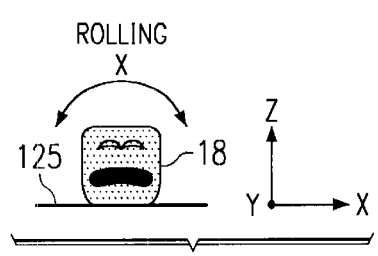
FIG. 7 shows the X-direction rolling of a fingertip side to side on the touchpad upper surface.

FIG. 7 represents the X-direction rolling of fingertip 18 side to side on surface 125. In accordance with the direction of this rolling movement, a blob 170 is produced, as is shown in FIGS. 5E and 5D. That is, the rolling of fingertip 18 to the left in FIG. 7 produces the condition shown in FIG. 5E, and leftward cursor movement occurs, as is represented by arrow 173. However, when the rolling of fingertip 18 to the right produces the condition of FIG. 5D, rightward cursor movement as represented by arrow 174 occurs.

Figure 5I:
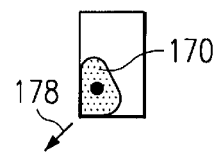
Figure 5G:
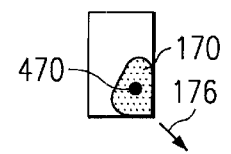

In a like manner, FIGS. 5F and 5G show how diagonal cursor movements 175 and 176 occur as a result of the combined pitch and roll of fingertip 18 in one diagonal direction on surface 125, whereas FIGS. 5H and 5I s show how diagonal cursor movements 177 and 178 occur as a result of the combined pitch and roll of fingertip 18 in an orthogonal diagonal direction on surface 125.

Figure 8:
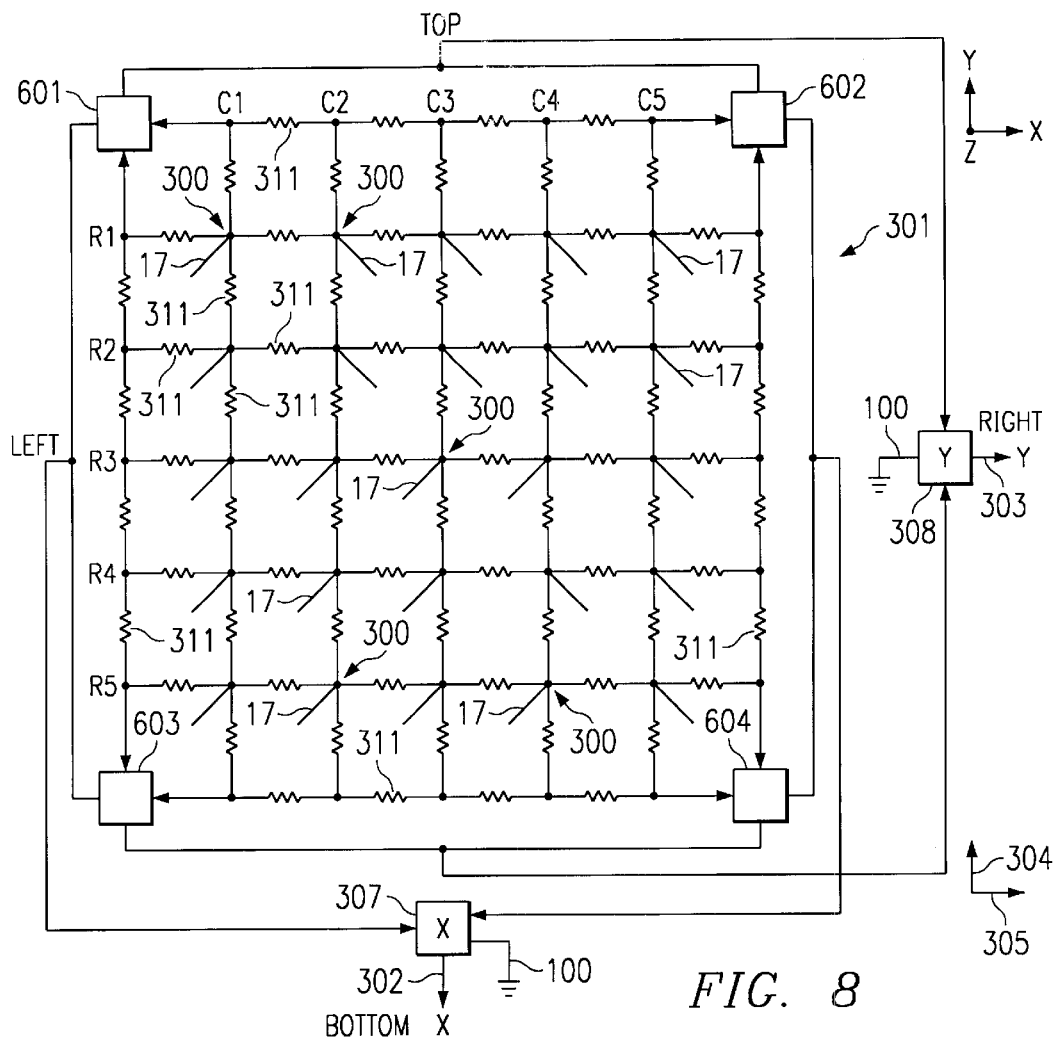
FIG. 8 is a circuit embodiment of this invention wherein the amplifier output signal from each of 25 sensor cells of a modified FIG. 1 are connected to a corresponding one of 25 resistor nodes within a row/column resistor network or array.

FIG. 8 is a top view that is taken in the X-Y plane showing an embodiment of this invention having four corner-located current mirrors and adders, or current-buffers 601–604, wherein the amplifier output 17 of each of 25 node-cells 2 is connected to a different one of the 25 nodes 300 of a resistive network 301, each node 300 being established by the intersection of a cell-column C1–C5 with a cell-row R1–R5. Resistive network 301 comprises a pseudo-resistive network having four corner-located current mirrors and adders, or current buffers 601–604, that operates to detect the mass or area and centroid 470 of the blob signals 170 that are shown in the various ones of FIGS. 5.

Figure 9:
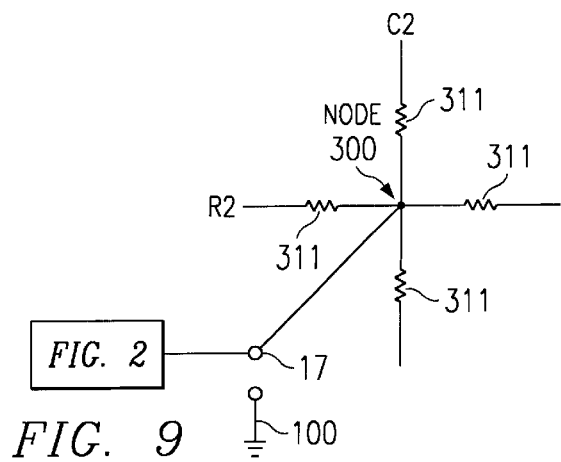
FIG. 9 shows one individual resistor node of FIG. 8 connected to receive the output of a corresponding individual amplifier of the type shown in FIGS. 2–3, FIG. 9 also showing four resistors that interconnect this resistor-node to adjacent resistor nodes.

FIG. 9 shows one individual resistor-network node 300 connected to the output 17 of its corresponding individual FIG. 2 node-amplifier. FIG. 9 also shows four resistors 311 that connect this node 300 to its four adjacent nodes 300. For example, if node 300 of FIG. 9 is the node that is formed by the intersection of node-column C2 and node-row R2, then its amplifier output 17 is the output of the FIG. 2 amplifier that is associated with the FIG. 1 cell that is located at the intersection of cell-column 2 and cell-row 2.

In this embodiment of the invention, array 3 of FIGS. 1–3 is first used to acquire user-fingerprint-ID during log-on, as was described relative to FIG. 4. Thereafter, output 17 of each of the 25 cell-amplifiers of FIG. 2 is connected to a corresponding one of the 25 resistor-nodes 300 shown in FIG. 8.

In the FIG. 8 mode of operation, electrical outputs 302 and 303, respectively, provide the X-direction component and the Y-direction component of an output signal that defines the user's desired cursor/pointer screen movement direction. For example, signals 302,303 are used to control movement of a cursor/pointer across a TV or monitor screen, with this movement being continuous by virtue of a static/non-moving position of a fingertip 18 on the surface of the FIG. 8 touchpad.

As taught by D. L. Standley in an article entitled "An Object Position and Orientation IC with Embedded Imager" in the *IEEE Journal of Solid State Circuits* (26, 1853–1858, December 1991), outputs 302,303 provide an analog value which is proportional to the zero and first moment of the 2D-pattern.

With reference to FIGS. 5B and 5C, if it is assumed that a fingertip position produces blob 170 of FIG. 5B, then output 302 is essentially of zero magnitude, whereas output 303 is of a given magnitude and a given polarity or signal sense. As a result, upward cursor movement 171 is produced. If it is now assumed that the fingertip position produces bright blob 170 of FIG. 5C, then output 302 remains essentially zero, whereas output 303 is now of a given magnitude, but of an opposite polarity or signal sense, and downward cursor movement 172 results. In a like manner, outputs 302,303 can be related to the cursor movements as explained relative to the remaining ones of FIGS. 5.

As stated previously, the user achieves a desired cursor/pointer movement by sidewise rolling movement of fingertip 18, represented by arrow 304, and/or by lengthwise end to end pitching of fingertip 18, represented by arrow 305.

During log-on, when the user is being identified/verified by comparing an acquired fingerprint pattern to the memory-stored fingerprint patterns 162 of FIG. 4, the individual cell outputs 17 of the array are serially scanned. However, thereafter, and as the array is used in accordance with this invention to achieve screen cursor/pointer control, the touchpad's individual cell outputs 17 are not scanned. Rather, each individual cell output 17 is connected to an individual node 300 of row/column resistive network 301.

Array 301 generates a X-direction cursor/pointer movement command 302, that is a horizontal left/right screen movement command, as fingertip 18 is moved, or rolled, sideways on the upper horizontal surface of array 301, this movement being indicated by arrow 305. Array 301 generates a Y-direction cursor/pointer movement command 303 that is a vertical up/down screen movement command, as fingertip 18 is moved, or pitched, end to end on the horizontal upper surface of array 301, this movement being indicated by arrow 304. Array 301 also generates a switch output or Z-command output as long as fingertip 18 is pressed vertically down onto the general geometric center of the current position of fingertip 18 on the horizontal upper surface of array 301.

As previously stated, one step in enabling touchpad operation, as shown at step 165 of FIG. 4, may be to switch each FIG. 2 node-amplifier 13 from low gain to high gain by operation of a change in the magnitude of the voltage Vr of FIG. 1. When each node-amplifier 13 operates at this high gain, or in the alternative, when the resolution of array 301 is low, the composite electrical outputs 17 of all node-amplifiers 13 can be described as an electronic array picture having a blob 170 that is located on a dark background wherein the central position 470 of this blob on the dark background corresponds to the area of contact of fingertip 18 with the top horizontal surface of array 301.

The first-moment coordinates of the position of this blob 170, or brightness function within this electronic picture, encodes the X and Y displacement or finger position on the array's top surface, while the zero-moment value of bright blob 170 encodes the finger's downward, or Z-direction pressure function. Networks 307 and 308 of FIG. 8 operate to determine the first-moment-coordinates and the zero-moment-value that are encoded within this electronic picture.

In order to calculate the two X and Y array outputs 302,303, two options are available. First, the entire electronic image of the array, that is all cell-amplifier output signals 17, is transferred into a computation system where the first-moment-coordinates and the zero-moment-value (also called "mass" and "centroid") are calculated using hardware or software. Second, analog computation may be performed on the FIG. 8 analog values that are proportional to the zero and first moment of the 2-D pattern.

The resistor-network embodiment of the invention utilizes the first above-mentioned technique by way of the following hardware. Relative to FIG. 1, the two-dimensional (2D) electronic signal-picture, output, or pattern of array 3, which encodes the touching function of fingertip 18 on the array's upper surface, is injected into nodes 300 of the 2D resistive network 301 of FIG. 8. Networks 307,308 then function to detect the centroid and the mass of this array output signal. The functions centroid and mass are calculated simultaneously by the FIG. 8 arrangement.

As shown in FIG. 8, each node 300 is connected to its adjacent nodes 300 by way of a resistor 311. While the resistance values, or magnitudes of resistors 311 are not critical, all resistors 311 should be of generally the same resistance value or magnitude. In addition, and as stated above, as a feature of the invention, resistors 311 are implemented by way of MOS transistors.

While the above description assumes that a fingerprint pattern is first acquired, and touchpad use is thereafter enabled, it is also possible in accordance with the spirit and scope of this invention, that cursor/pointer control by virtue of finger rotation/position can be detected concurrently as the fingerprint pattern itself is detected.

The above detailed description of embodiments of this invention is not to be taken as a limitation on the spirit and scope of this invention, since it is apparent that those skilled in the related art will, upon reading this detailed description, readily visualize yet other embodiments that are clearly within the spirit and scope of this invention.

What is claimed is:

1. A capacitance touchpad for determining user-authorization of a device having a display screen, followed by providing an electrical output signal for selectively controlling movement of a cursor across the display screen, comprising:

a sensing surface adapted to receive a user fingertip;

a plurality N of capacitance sensing cells associated with the sensing surface and arranged in a first row/column array having N row/column intersections, the first array having one sensing cell located at each row/column intersection;

each of the sensing cells having an amplifier with an amplifier input and an amplifier output, a first and a second physically spaced capacitor plate associated with the sensing surface, and circuit means connecting the first capacitor plate to the amplifier input and the second capacitor plate to the amplifier output;

user-authorization means connected to the first array and operable to generate a user fingerprint pattern for comparison to authorized user fingerprint patterns, and to enable operation of the touchpad to thereafter control movement of the cursor as a function of a contact area of a user fingertip on the sensing surface;

a plurality N of individual resistance nodes arranged in a second row/column array, the second array having N row/column intersections in a configuration that corresponds to the N row/column intersections of the first array;

circuit means connecting each of the amplifier outputs within the first array to a corresponding resistance node of the second array;

first computation means connected to the second array for computing a centroid output signal as a function of the contact area of the user fingertip on the sensing surface; and first output means connected to the first computation means and providing a pointer movement control signal as a function of the centroid output signal.

2. The capacitance touchpad of claim 1, including:

second computation means connected to the second array for computing a mass output signal as a function of the contact area occupied by the user fingertip on the sensing surface; and second output means connected to the second computation means and providing a switch on/off signal as a function of the mass output signal.

3. A touchpad providing an output signal that is indicative of a desired direction of movement of a cursor across a generally flat display screen, comprising:

a generally flat dielectric sensing surface having a plurality of surface-portions, the sensing surface being adapted to be physically touched by a fingertip, a plurality R×C of sensor-cells associated with the surface-portions, the sensor-cells being arranged in a cell array having R rows and C columns, wherein R and C are integers, the rows and columns forming R×C intersections with one of the sensor cells being located at each of the intersections and at a corresponding surface portion of the sensing surface, each of the sensor-cells having an amplifier with an amplifier input and an amplifier output, each of the sensor cells having a first and a second physically spaced capacitor plate associated with but isolated from the corresponding surface portion, each of the sensor cells having circuit means connecting the first capacitor plate to the amplifier input and the second capacitor plate to the amplifier output to provide a negative input to output amplifier feedback signal as a function of a fingerprint pattern on a portion of the fingertip touching the corresponding surface-portion;

a plurality R×C of resistor nodes arranged in a resistor array having R rows and C columns, the rows and columns forming R×C intersections with one of the resistor nodes being located at each of the intersections;

a plurality R×C of circuit means, each circuit means connecting one of the amplifier outputs to one resistor node;

first computation means connected to the resistor array and operable to compute a centroid output signal as a function of surface portions touched by a fingertip; and output means connected to the first computation means and providing a cursor-movement signal as a function of the centroid output signal.

4. The touchpad of claim 3, including:

second computation means connected to the resistor array for computing a mass output signal as a function of a surface portion area touched by a fingertip; and second output means connected to the second computation means and providing a switch open/closed signal as a function of the mass output signal.

5. A capacitance touchpad first useful to determine user-authorization of a device having a display screen, and thereafter useful for providing an electrical output signal that is operable to selectively control movement of a cursor across the display screen, comprising:

a dielectric sensing surface adapted to be physically engaged by a user's fingertip;

a plurality N of capacitance sensing cells associated with the sensing surface and arranged in a first row/column array having N row/column intersections, the first array having one sensing cell located at each row/column intersection, each of the sensing cells having an amplifier with an amplifier input and an amplifier output, a first and a second physically spaced capacitor plate associated with the sensing surface, and circuit means connecting the first capacitor plate to the amplifier input and the second capacitor plate to the amplifier output to provide amplifier feedback;

user-authorization means connected to the first array, operable to cause the sensing cell amplifiers to operate in a low-gain mode, operable to generate a user fingerprint pattern for comparison to stored authorized user fingerprint patterns, and operable upon a match being detected to cause the sensing cell amplifiers to operate in a high-gain mode and to enable operation of the touchpad thereafter for use to control movement of the cursor as a function of a contact area of a user fingertip on the sensing surface;

a plurality N of resistance nodes arranged in a second row/column array, the second array having N row/column intersections in a configuration that corresponds to the N row/column intersections of the first array;

circuit means connecting each of the amplifier-outputs within the first array to a correpsonding resistance node of the second array;

first computation means connected to the second array for computing a centroid output signal as a function of the contact area of a user's fingertip on the sensing surface, and first output means connected to the first computation means and providing a cursor movement control signal as a function of the centroid output signal.

6. The capacitance touchpad of claim 5, including:

second computation means connected to the second array for computing a mass output signal as a function of the contact area occupied by a user fingertip on the sensing surface; and second output means connected to the second computation means and providing a switch on/off signal as a function of the mass output signal.

7. The capacitance touchpad of claim 5 wherein the plurality N of capacitance sensing cells and the plurality N of resistance nodes are integrated into a solid state unit.

8. A secure cursor control device, comprising:

a two dimensional array of individual capacitive sensing cells each including at least one capacitive electrode proximate to a sensing surface on which a human fingertip is placed for finger-print acquisition and each generating an output signal;

a plurality of individual resistors connected to form a two dimensional network of nodes each corresponding to a sensing cell within the array of sensing cells, each node receiving the output signal from the corresponding sensing cell, the network of nodes generating an output representing a location of a centroid for a contact area between the human fingertip and the sensing surface;

a processor receiving the output signals generated by the sensing cells and the output generated by the network of nodes, the processor employing the outputs of the capacitive sensing cells to verify a fingerprint on the human fingertip and employing the output of the network of nodes to control movement of a cursor in response to movement of the centroid.

9. The secure cursor control device of claim 8, wherein the processor compares the fingerprint on the human fingertip contacting the sensing surface to a fingerprint image for an authorized user of the secure cursor control device.

10. The secure cursor control device of claim 8, wherein the centroid of the contact area between the human fingertip and the sensing surfaces moves in response to rolling or pitching of the human fingertip on the sensing surface without requiring lateral movement of the human fingertip across the sensing surface.

11. The secure cursor control device of claim 8, wherein each sensing cell further comprises:

an amplifier connected between two sensing electrodes within the sensing cell, wherein the amplifier is shorted during finger-print acquisition to equalize an input voltage and an output voltage within the cell and wherein the amplifier, after the shorting of the amplifier is terminated, generates the output signal based a distance between a skin surface on the human fingertip and each of the two sensing electrodes, wherein the amplifier operates in a low-gain mode during finger-print acquisition and switches to a high-gain mode following a match of the acquired fingerprint to a fingerprint pattern for an authorized user.

12. The secure cursor control device of claim 8, wherein the network of nodes further comprises:

a current buffer at each corner of the network of nodes, each current buffer connected to a first series of resistors across an end of each column of nodes within the network and a second series of resistors across an end of each row of nodes within the network.

13. A sensor structure for secure fingertip control of a cursor, comprising:
an X-Y array of capacitive electrodes proximate to a sensing surface on which a human fingertip is placed, wherein the capacitive electrodes are utilized for fingerprint acquisition when the human fingertip is first placed on the sensing surface and are utilized for contact area detection after user authorization is determined; and
an X-Y array of nodes within a network of individual interconnected resistors, each node within the array receiving an output signal from a corresponding set of one or more capacitive electrodes, wherein the array of nodes is employed for contact area detection after user authorization is determined.

14. The sensor structure of claim 13, further comprising:
current buffers at each corner of the array of nodes, each current buffer connected across the array row end or the array column end of the array of nodes, each pair of current buffers at opposite ends of one side of the array of nodes generating an output signal;
an X-displacement network receiving the output signal from the current buffer pairs on opposite horizontal ends of the array of nodes and generating an X displacement signal for a centroid of a contact area between the human fingertip and the sensing surface; and
an Y-displacement network receiving the output signal from the current buffer pairs on opposite vertical ends of the array of nodes and generating an Y displacement signal for the centroid of the contact area.

15. The sensor structure of claim 14, wherein the X-displacement network and the Y-displacement network generate a mass signal for the contact area, wherein the mass signal corresponds to pressure of the human fingertip on the sensing surface.

16. The sensor structure of claim 14, wherein the X-displacement network and the Y-displacement network calculate a zero moment value and first moment coordinates for the contact area to generate the mass signal and the X and Y displacement signals.

* * * * *